United States Patent [19]

Kuboki et al.

[11] Patent Number: 5,315,404

[45] Date of Patent: May 24, 1994

[54] IMAGE PROCESSING METHOD AND APPARATUS FOR PROCESSING AN IMAGE SIGNAL IN EACH OF A PLURALITY OF PROCESSING MODES

[75] Inventors: Keiju Kuboki, Kawasaki; Kiyohisa Sugishima, Yokohama; Yutaka Udagawa, Machida; Toshihiko Otsubo, Yokohama; Masahiro Nishio, Tokyo, all of Japan

[73] Assignee: Canon Kabushiki Kaisha, Tokyo, Japan

[21] Appl. No.: 775,088

[22] Filed: Oct. 11, 1991

[30] Foreign Application Priority Data

Oct. 17, 1990 [JP] Japan .................................. 2-279702

[51] Int. Cl.$^5$ ............................................. H04N 1/415
[52] U.S. Cl. ...................................... 358/433; 358/448
[58] Field of Search ................................ 358/432–433, 358/448

[56] References Cited

U.S. PATENT DOCUMENTS

| 5,051,840 | 9/1991 | Watanabe et al. | 358/433 |
| 5,060,285 | 10/1991 | Dixit et al. | 358/433 |
| 5,101,280 | 3/1992 | Moronaga et al. | 358/433 |
| 5,150,433 | 9/1992 | Daly | 358/433 |

Primary Examiner—Stephen Brinich
Attorney, Agent, or Firm—Fitzpatrick, Cella, Harper & Scinto

[57] ABSTRACT

An image processor, for example a digital color copier, receives an image signal transmitted in one of a plurality of different modes to process an image of one picture. An analyzer determines the processing mode of the received image signal. A first processor is selected for sequentially processing the image signal for one picture a line at a time in accordance with the analyzer determining one processing mode was received. A second processor is selected and receives the whole image signal for one picture for processing as a block in accordance with the analyzer determining a different mode was received. A processed image is output from the processor selected by the analyzer.

39 Claims, 12 Drawing Sheets

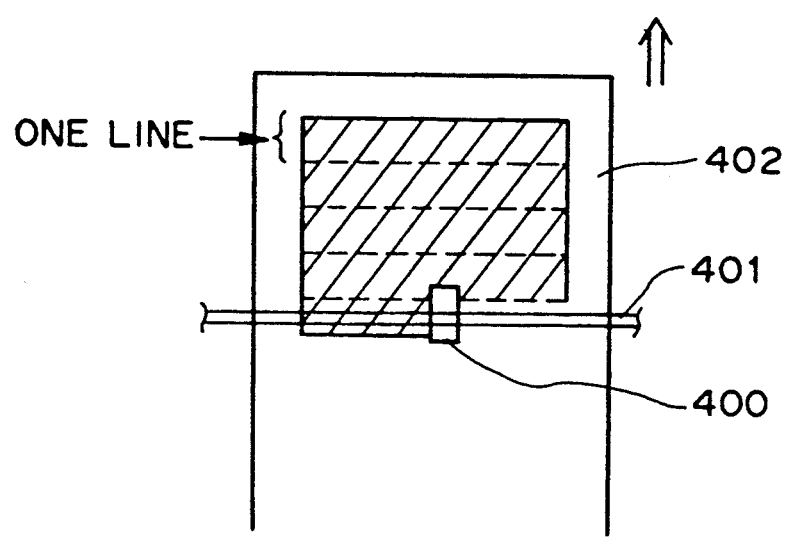
F I G. 12

IMAGE PROCESSING METHOD AND APPARATUS FOR PROCESSING AN IMAGE SIGNAL IN EACH OF A PLURALITY OF PROCESSING MODES

BACKGROUND OF THE INVENTION

1. Field of the Invention

This invention relates to a method and an apparatus for image processing and, more particularly, to a method and an apparatus for image processing capable of processing an image signal in each of a plurality of processing modes.

2. The Prior Art

A conventional image processing apparatus is known which generally consists of a memory and an interface and which effects processing for inputting an image from an external unit or outputting an image to the external unit. For example, this apparatus is used in combination with a reader, a printer or the like in such a manner as to output an image read by the reader to an external unit or output by a printer an image which is transferred from an external unit.

Such an image processing apparatus requires being adaptable to a printer having a printing process as shown in FIG. 12. FIG. 12 shows an ink jet head unit 400, a rail 401 on which the unit 400 moves, and a recording sheet 402. The ink jet head unit 400 is driven by a driving unit (not shown) to scan from the left to right as viewed in FIG. 12 to output an one-line image. "One-line image" denotes an image formed on the recording sheet by one cycle of scanning of the ink jet head unit 400. Accordingly, "one-line image" as hereinafter referred to in this specification denotes an image or image data formed by one cycle of scanning of a recording head provided in a printer.

After a one-line image has been output, the recording sheet 402 is transferred upward as viewed in FIG. 12 (in the direction of the arrow) to an extent corresponding to one line, while the head unit 400 moves on the rail 401 to return to the left end position. This process is repeated to form the entire image.

A printer having such a process is characterized such that the printing process can be stopped each time one head scanning cycle is completed. In a case where this printer is operated in association with the above-mentioned image processing apparatus, a process may be adopted such that a one-line image signal is written in a memory from the outside and is output, and another one-line image signal is transferred from the outside to the memory after the outputting of the former signal has been completed, to enable an image output having an amount of data exceeding the memory capacity.

Although an apparatus operating in a mode of repeating processing by reading one-line image data and outputting the data for printing (hereinafter referred to as "line data sequential processing") can process a large amount of image data which exceeds the memory capacity, it cannot be adapted to editing processing, including registration of the entire image data in the memory or modifying a registered image layout.

Also, the apparatus cannot be applied to processing image data in which R, G and B color components are expressed by multi-value data, and the data is entirely transferred to a frame memory and developed with respect to each color (which processing is hereinafter referred to as "frame data sequential processing").

SUMMARY OF THE INVENTION

Accordingly, it is a purpose of the present invention to provide an image processing apparatus capable of suitably processing image signals given in various forms.

To achieve this objective, according to the present invention, there is provided an image processing apparatus which receives an image signal transmitted in one of a plurality of different modes to process an image of one picture, comprising analysis means for analyzing the contents of the modes, first processing means for sequentially processing the image signal for one picture while receiving the same, part by part, in accordance with the result of analysis effected by the analysis means, second processing means for receiving the whole image signal for one picture and for processing the same, as a block, in accordance with the result of analysis effected by the analysis means, and output means for outputting the image processed by one of either the first or second processing means.

Another objective of the present invention is to provide an image processing apparatus capable of processing a plurality of image signals by using a small-capacity memory means.

To achieve this objective, according to the invention, there is provided an image processing apparatus which receives an image signal transmitted in one of a plurality of different modes to process an image of one picture, comprising memory means for storing the image signal, checking means for examining the mode, the amount of the received signal and the capacity of the memory means at the time of reception of the image signal, and control means for effecting a control based on the result by checking of the checking means, in a manned such that the amount of the image signal is less than or equal to the capacity of the memory means, if the total amount of the received image signal is greater than the capacity of the memory means while disabling the control, if the total amount of the received image signal is not greater than the capacity of the memory means.

Another objective of the present invention is to provide an image processing method for processing an image signal in accordance with a given processing mode among a plurality of processing modes.

To achieve this objective, according to the present invention, there is provided an image processing method in which an image signal transmitted in one of a plurality of different modes is received to process an image of one picture, comprising the step of receiving the whole image signal for one picture and processing the same, as a block, in accordance with the mode or sequentially processing the image signal for one picture while receiving the same, part by part.

Another objective of the present invention is to provide an image processing method for processing an image signal by considering the capacity of a recording medium.

To achieve this objective, according to the present invention, there is provided an image processing method in which a received image signal is designated as being in one of a plurality of different modes, and is stored on a recording medium, and in which the image signal is read from the recording medium to process an image of one picture, comprising the step of sampling the received image signal to set an amount of the image signal within the capacity of the recording medium, if the total amount of the received image signal is greater than the capacity of the recording medium.

Another objective of the present invention is to provide an image processing method for processing an image signal by considering the capacity of a recording medium.

To achieve this objective, according to the present invention, there is provided an image processing method in which a received image signal is designated as being in one of a plurality of different modes, and is stored on a recording medium, and in which the image signal is read from the recording medium to process an image of one picture, comprising the step of sequentially processing the image signal for one picture while receiving the same, part by part, irrespective of the mode, if the total amount of the received image signal is greater than the capacity of the recording medium.

These methods and apparatuses of the present invention enable suitable processing independent of the kind of given image signal.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 12 is a diagram illustrating a printing process of a conventional printer.

DESCRIPTION OF THE PREFERRED EMBODIMENTS

Preferred embodiments of the present invention will now be described in detail in accordance with the accompanying drawings.

Figure 1:
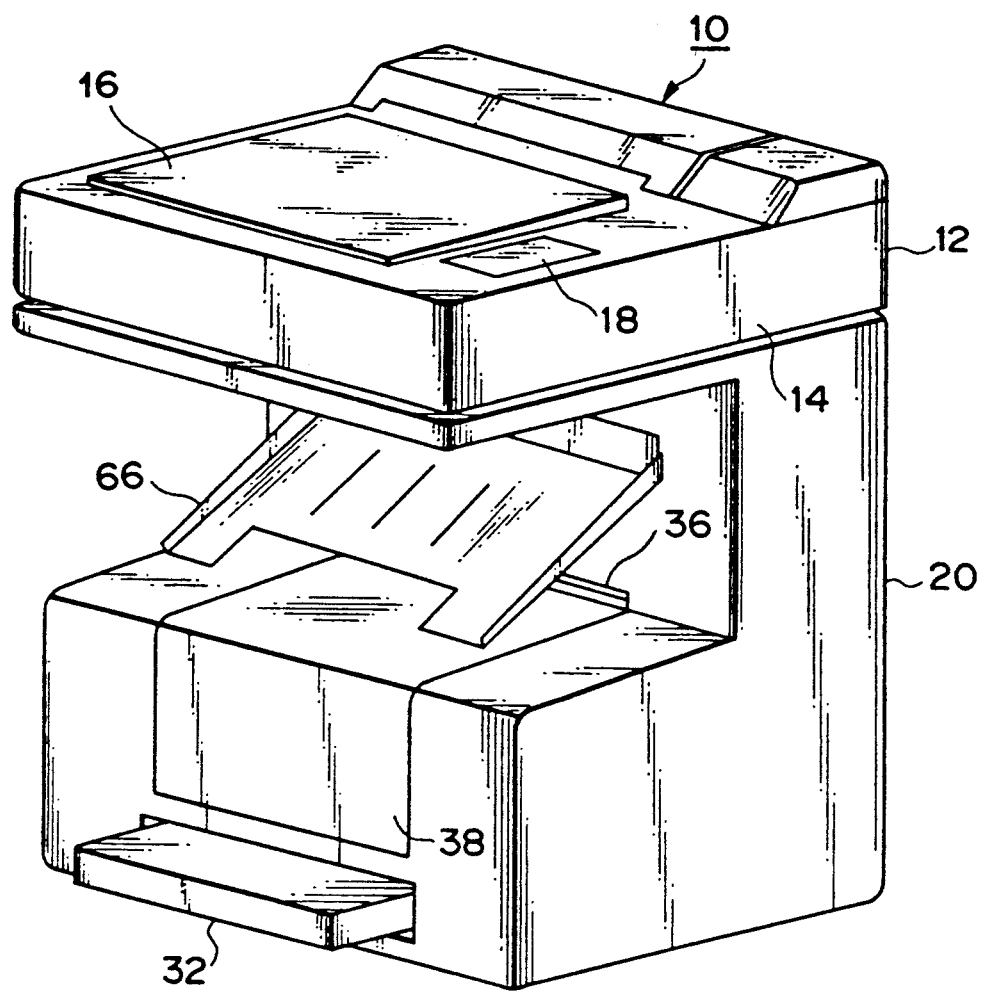
FIG. 1 is a schematic diagram of an overview of a digital color copier which processes an image signal in accordance with a preferred embodiment of the present invention.

Outline of the construction of the apparatus of FIG. 1

FIG. 1 schematically illustrates a digital color copier for image signal processing in accordance with a typical embodiment of the present invention. This digital color copier 10 basically consists of two components.

As a first component, a color image scanner unit (hereinafter referred to as "reader unit") 12 is provided which forms an upper portion of the apparatus and which reads a color original image to output color image data. The reader unit 12 incorporates a controller 14 having processing functions for various image processing of digital color image data, interfacing with an external unit, and the like.

The reader unit 12 also incorporates a mechanism for reading image information from an original placed on an original table (not shown) provided below an original retaining plate 16 so as to face downward. The original may be one of a plurality of originals having various shapes and sizes, such as cubic or sheet-like members and large-size sheets. An operation panel 18 connected to the controller 14 is provided on an upper surface of a side portion of the reader unit 12. Various kinds of information, operation instructions and the like for the copier are input through the operation panel 18. The controller 14 is arranged to perform command operations for reader unit 12 or a below-described printing unit according to information input through the operation panel 18. If there is a need to perform a complicated edition processing, a digitizer or the like is attached in place of the original retaining plate 16 and is connected to the controller 14 to effect image processing of a higher level.

As a second component, a printing unit 20 is provided which is positioned below the reader unit 12 and which records on a recording sheet a digital color signal output from the controller 14 of the reader unit 12.

In the printing unit 20 of this embodiment, a full-color ink jet printer using a recording head which deposits ink by film boiling, which is referred to as an ink bubble jet recording type, such as disclosed in Laid-Open Japanese Patent Application No.54-59936.

The above-described two-components are designed to be separable from each other and to be capable of being placed at a distance from each other by extending a connection cable.

Figure 2:
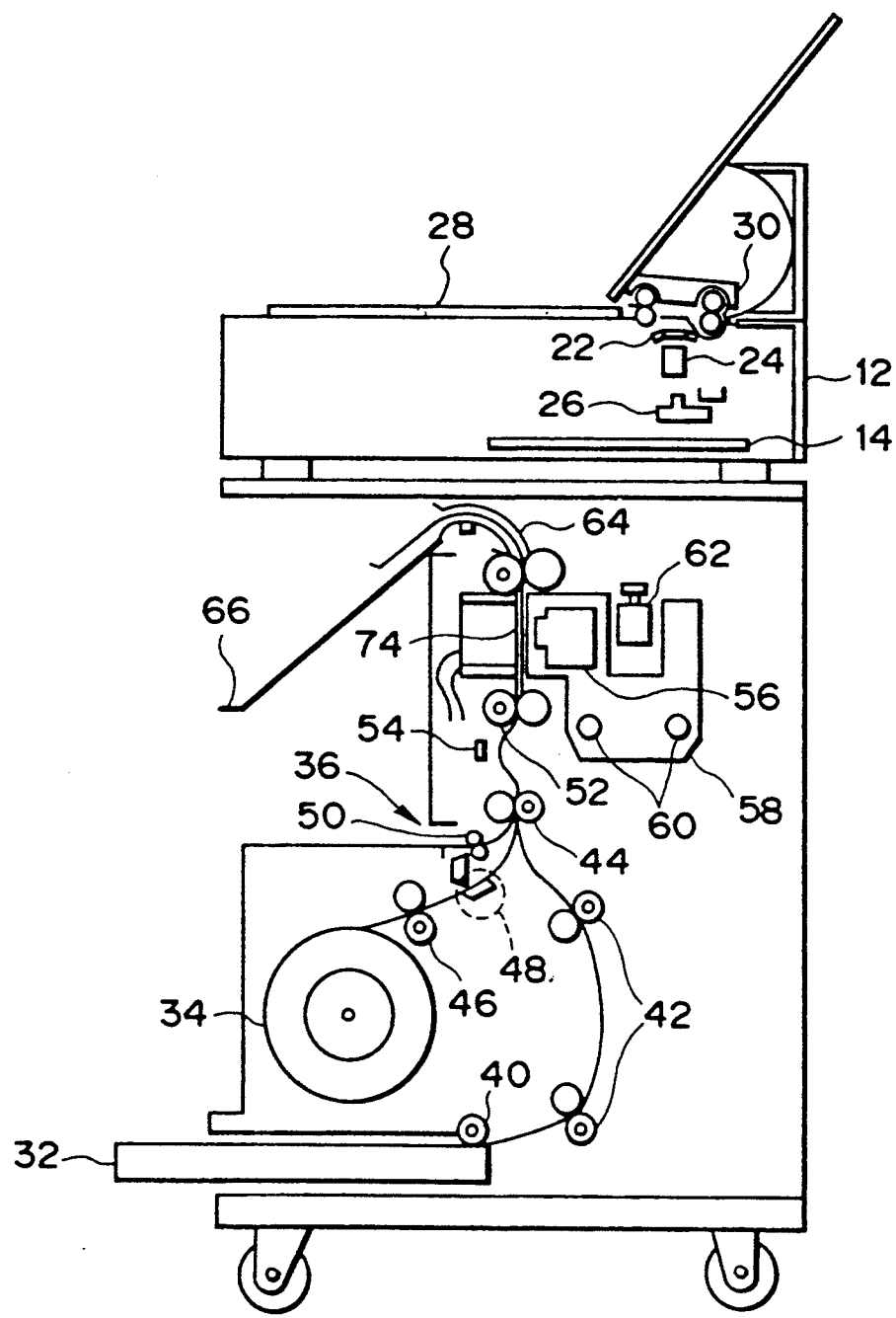
FIG. 2 is a cross-sectional view of the digital color copier shown in FIG. 1.
Figure 3:
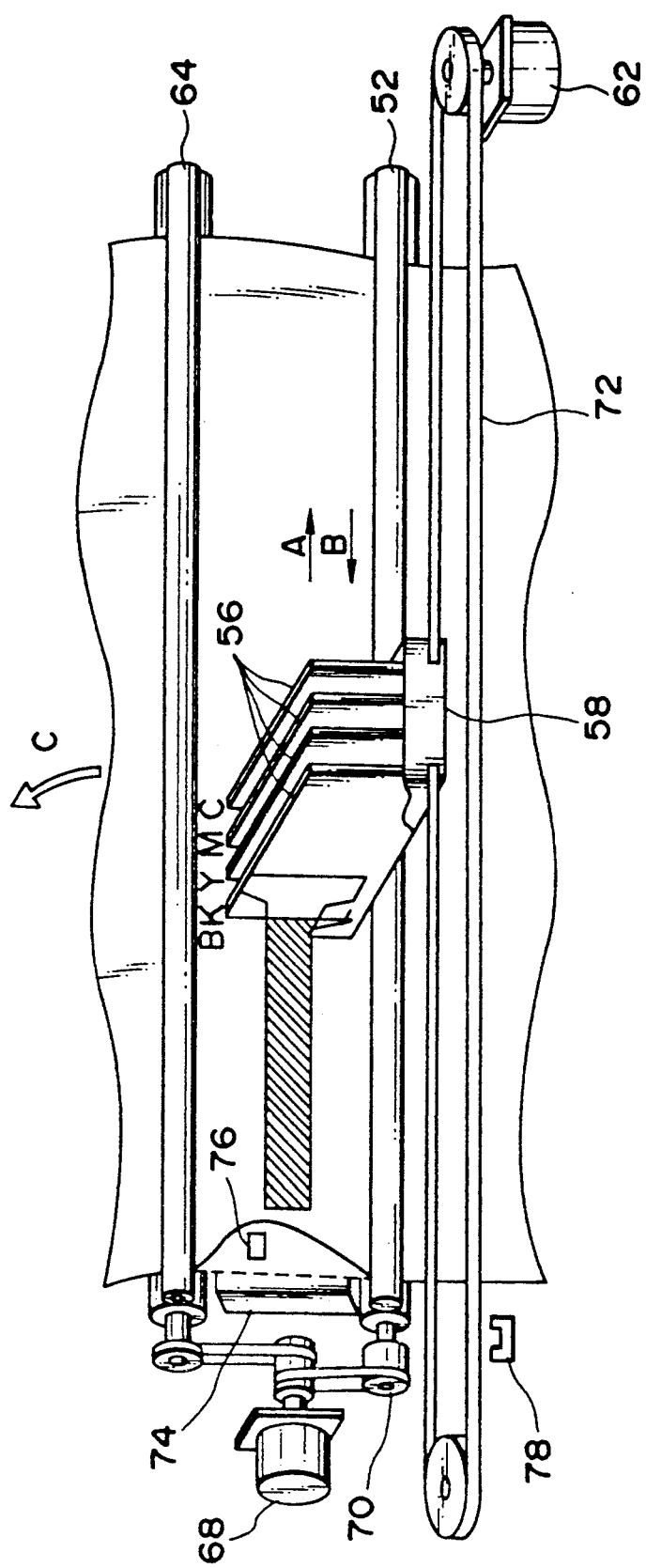
FIG. 3 is a diagram of the construction of main components of printing unit 20 shown in FIG. 2.

Details of the components of the apparatus of FIGS. 2 and 3

Details of the two components and the construction of a scanning carriage system will be described below.

FIG. 2 is a cross-sectional view showing the internal construction of the digital color copier 10 shown in FIG. 1.

Reader unit 12

In the reader unit 12, an original (manuscript) image placed on an original table glass 28, an image projected by a projector or a sheet-like original image supplied by a sheet feed mechanism 30 is read by means of an exposure lamp 22, a lens 24 and an image sensor 26 capable of full-color reading a line image (a CCD sensor in this embodiment).

Each of various kinds of processing of image information read by the reader unit 12 is conducted by the controller 14. The image-processed information is thereafter sent to the printing unit 20 to be recorded on a recording sheet.

Printing unit 20

In the printing unit 20, a recording sheet is selectively supplied from a paper feed cassette 32 in which cut paper sheets having a small standard size (A4 to A3 size in accordance with Japanese Industrial Standard (JIS) in this embodiment) are accommodated and a roll of paper sheet 34 for large size (JIS A2 to A1 in this embodiment) recording. In this embodiment, it is possible to perform manual paper feeding (paper feeding from the outside of the apparatus) by inserting recording sheets into a manual feed inlet 36 one by one along a feeder cover 38.

In practice, paper feeding is started by a print start instruction output from the controller 14. When paper feeding is started, a recording sheet is first transferred to a first feed roller 44 through one of paths described below.

In the case of recording sheet feeding from the paper feed cassette 32 attached to the printing unit 20, a pick-up roller 40, which is arranged on an upper surface of a recording setting face feed end of the paper feed cassette 32 to extract cut paper sheets from the paper feed cassette 32 one by one, is driven to extract the uppermost one of the recording sheets set in the paper feed cassette 32. The extracted recording sheet is fed to a cut paper feed roller 42 and is further transferred to the first feed roller 44.

In the case of the paper roll 34, the unrolled sheet is continuously forwarded by a roll paper feed roller 46, cut by a cutter 48 to have a standard length, and transferred to the first feed roller 44.

Similarly, in the case of manual feeding through the manual feed inlet 36, a recording sheet manually inserted is transferred to the first feed roller 44 by a manual insertion roller 50.

The pick-up roller 40, the cut paper feed roller 42, the roll paper feed roller 46, the first feed roller 44 and the manual insertion roller 50 are driven by a feed motor (not shown) which employs a DC servo motor, and the driving for rotating each roller can be on/off-controlled by suitable timing by an electromagnetic clutch provided in association with the roller.

Thus, the recording sheet selectively supplied through one of these feed channels is transferred to the first feed roller 44.

To prevent a skew of the recording sheet at the time of paper feeding, a predetermined slack or loop of the recording sheet is formed and the operation of rotating the first feed roller 44 is thereafter started, and the recording sheet is then transferred to a second feed roller 52.

To ensure accurate paper feeding between a transfer roller 64 disposed above a recording head 56 and the second feed roller 52 disposed below the recording head 56, a buffer is formed between the first and second feed rollers 44 and 52 by slackening the recording sheet to a predetermined extent.

For this buffer, a buffer amount detection sensor 54 for detecting the amount of buffering or the amount of a slack of the recording sheet is provided. If a buffer is constantly formed in the recording sheet during paper feeding in this manner, the load imposed upon the transfer roller 64 and the second feed roller 52 can be reduced particularly when a large-size recording sheet is transferred, thereby enabling accurate paper feeding.

In the printing system having the thus-constructed recording sheet transfer system, a scanning carriage 58 on which the recording head 56 is mounted is arranged to be reciprocatively moved on carriage rails 60 in a direction perpendicular to the plane of projection of FIG. 2 by a scanning motor 62 to scan the recording sheet in a main scanning direction. During scanning through a going path, an image is printed on the recording sheet by the recording head 56. During scanning through a returning path, an operation of transferring the recording sheet in a sub scanning direction to a predetermined extent is performed with the transfer roller 64.

The extent of transfer in the sub scanning direction is defined as a later-mentioned constant extent of movement. In this embodiment, it is set to a length corresponding to a width of the recording head 56 in the sub scanning direction, i.e., a width through which vacuuming holes (not shown) are formed in a surface portion of a platen 74 facing the recording head 56. The vacuuming holes are used to maintain the recording sheet in close contact with the platen 74.

For control of a recording sheet driven by the scanning motor 62 during return scanning, the amount of buffering is detected by the buffer amount detection sensor 54 to control the driving so that the recording sheet is constantly slacked in accordance with the predetermined amount of buffering.

The recording sheet used for printing is finally discharged onto a discharge tray 66, thereby completing the sequence of printing operations.

Construction of the scanning carriage system

Details of the scanning carriage 58 and other related components will be described below with reference to FIG. 3.

A component 68 shown in FIG. 3 is a transfer motor which serves as a drive source for transferring the recording sheet in the sub scanning direction in a stepping manner. The extent of rotation of the transfer motor 68 can be freely selected and changed, and the transfer motor 68 drives the transfer roller 64 and drives the second feed roller 52 through a second feed roller clutch 70. The scanning motor 62 is a drive source for reciprocatively moving the scanning carriage 58 in main scanning directions, indicated by arrows A and B, by a scanning belt 72. Pulse motors are used as the transfer motor 68 and the scanning motors 62 because accurate paper transfer to a desired extent is required.

In this embodiment, a paper retaining member (not shown) is disposed at a position such as to face a lower end portion of the platen 74. The paper retaining member is controlled to fix the recording sheet on the platen during scanning of the scanning carriage 56 in order to prevent the recording sheet from shifting.

When the recording sheet reaches the second feed roller 52, the second feed roller clutch 70 and the transfer motor are turned on, and the recording sheet is transferred on the platen 74 until its leading end is clamped by one pair of transfer rollers 64. A transfer of the recording sheet over the platen 74 is detected by a paper detection sensor 76 provided on the platen 74.

Information from this sensor is used for position control, jam control and the like.

When the leading end of the recording sheet reaches the transfer roller 64, the second feed roller clutch 70 and the transfer motor 68 are turned off and an operation of vacuuming a cavity, formed in the platen 74 by a vacuuming motor (not shown), is started. By this vacuuming operation, the recording sheet 74 is maintained in close contact with the platen 74. At this time, the above-mentioned paper retaining member operates simultaneously to fix the recording sheet on the platen 74.

Before the operation of printing an image on the recording sheet, the scanning carriage 58 moves to a position at which a home position sensor 78 is disposed, and then starts going scanning in the direction of arrow A. During this going scanning, cyan (C) ink, magenta (M) ink, yellow (Y) ink, and black (BK) ink are ejected from the recording head 56 to effect image recording (printing).

After the operation for image recording through a predetermined distance in the main scanning direction has been completed, the direction of driving of the scanning motor 62 is reversed and the scanning carriage 58 is moved in the reverse direction, i.e., the direction of arrow B to start return scanning. The scanning motor 62 is operated for reverse driving until the scanning carriage 58 returns to the position at the home position sensor 78 disposition plate.

During this return scanning, the transfer motor 68 is started to rotate the transfer roller 64 to transfer the recording sheet in the direction of arrow C (sub scanning direction), through a distance corresponding to the width of the recording head 56 in the sub scanning direction corresponding to the area used for recording with the recording head 56. In this embodiment, the extent of this sheet transfer, i.e., the extent of movement in the sub scanning direction is not always set to a constant extent of movement corresponding to the width of the recording head 56, and it may be set to a different extent of movement determined by a final line width.

In this embodiment, the recording head 56 is an ink jet head having 256 nozzles with respect to each of the colors, yellow, magenta, cyan and black.

When the scanning carriage 58 is stopped at the home position determined by the home position sensor 78, a recording head 56 recovery operation is performed. This recovery operation is a process for performing stable recording by preventing occurrence of unevenness at the time of ejection starting due to variations in the viscosity of ink remaining in the nozzles of the recording head 56. In this processing, each nozzle of the recording head 56 is pressurized to effect nonprinting ejection through each nozzle in accordance with pre-programmed conditions such as feeding time, in-house temperature and ejecting time.

The above-described operations are repeated to record the desired image over the whole recording area of the recording sheet.

Figure 4A:
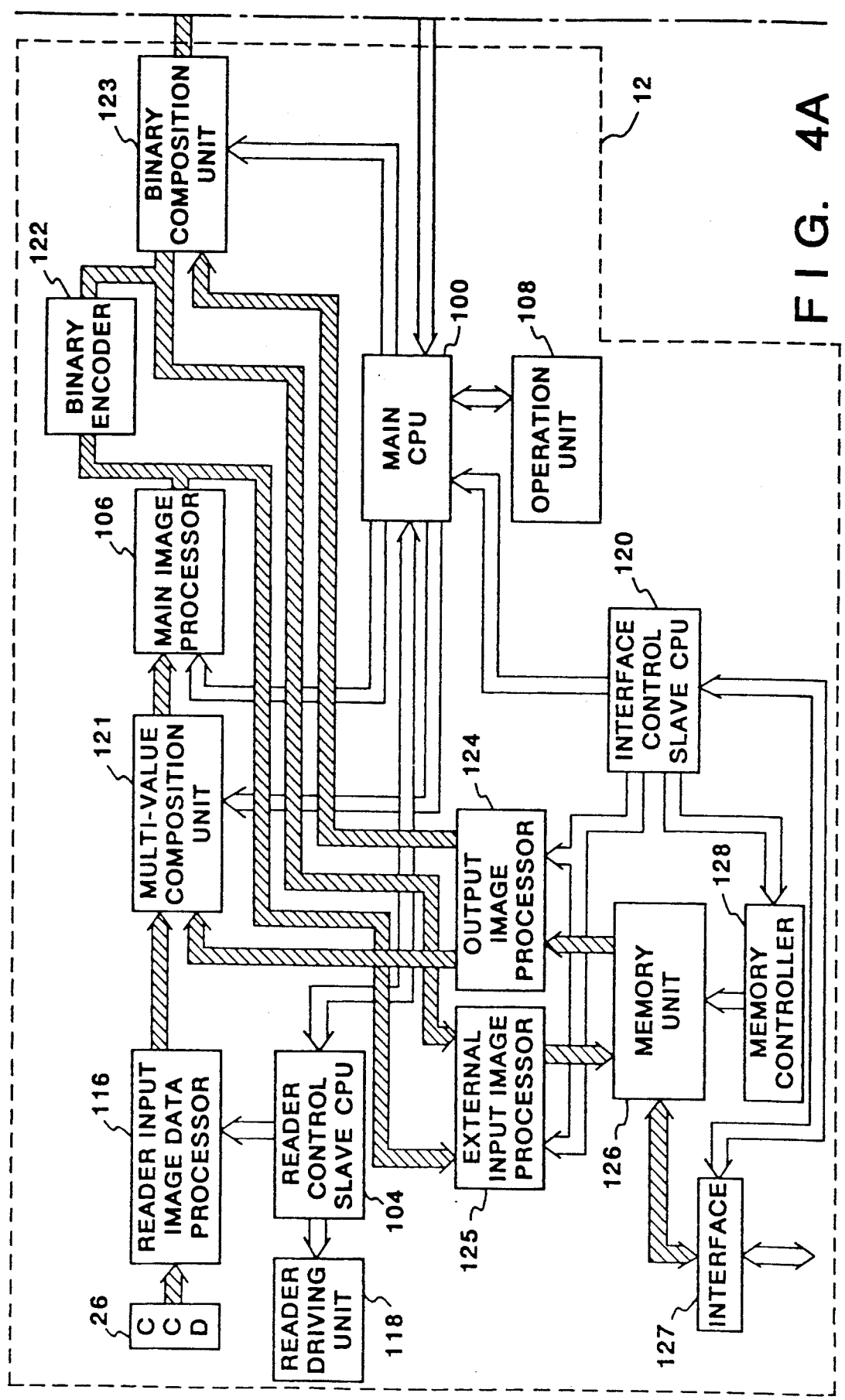
FIGS. 4A and 4B are block diagrams of the internal system construction of the apparatus shown in FIG. 2.
Figure 4B:
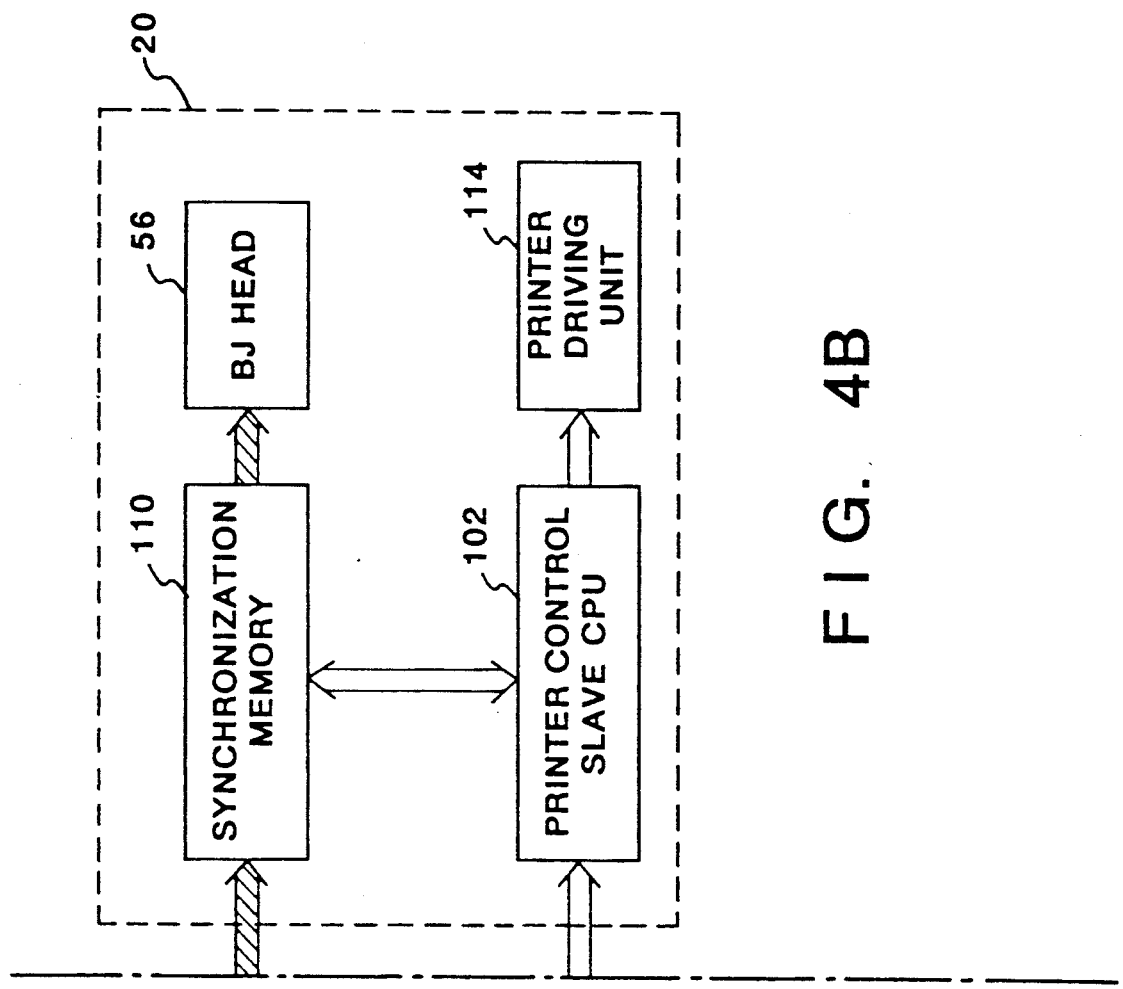

Description of the control system of FIGS. 4A and 4B

Image signal processing/control conducted by the control system of the digital color copier of this embodiment will now be described below with reference to the block diagram of the system construction shown in FIGS. 4A and 4B.

As shown, the control system also consists of the reader unit 12 (FIG. 4A) and printing unit 20 (FIG. 4B).

The reader unit 12 (FIG. 4A) includes a main CPU 100, a reader control slave CPU 104, a main image processor 106, an operation unit 108, a reader input image data processor 116, a reader driving unit 118, a CCD line sensor 26 serving as an image sensor, a multi-value composition unit 121, a binary encoder 122, a binary composition unit 123, a memory unit 126, an external input image data processor 125, an output image processor 124, a memory controller 128 described later in detail, an interface unit 127, and an interface control slave CPU 120.

The printing unit 20 (FIG. 4B) includes a printer control slave CPU 102, a synchronization memory 110, the recording head 56 and a printer driving unit 114.

Connected the main CPU 100 (FIG. 4A) for overall control of the apparatus are the printer control slave CPU 102 for controlling the printer, the reader control slave CPU 104 for controlling the reading operation, the interface control slave CPU 120 for controlling an interface and a memory, the main image processor 106 for processing image display operation and the operation unit 108 for input operations performed by the operator.

The printer control slave CPU 102, the reader control slave CPU 104 and the interface control slave CPU 120 are processors respectively dedicated to control of the operation of the printing unit, the reader unit and the memory unit, and which operate as CPUs slaved to the master CPU, i.e., the main CPU 100. The main image processor 106 performs image processing, such as edge enhancing/smoothing, masking, and black extraction. Further connected to the main CPU 100 are the multi-value composition unit 121 for combining an memory image and a reader image, and the binary composition unit 123 to which the binary encoder 122 for binary encoding processing is connected, and which effects binary composition from a memory image and a reader image.

The synchronization memory 110 is connected to the printer control slave CPU 102 and the binary composition unit 123. The synchronization memory 110 is used for buffering from time fluctuations of input operations and for correction of delays relating to the above-mentioned mechanical arrangement of the recording head. An output from synchronization memory 110 is supplied to the recording head 56 (bubble jet type head).

The printer control slave CPU 102 is connected to the printer driving unit 114 for controlling input driving of the printing unit.

The reader control slave CPU 104 is connected to the reader input image data processor 116 for correction processing required in the reading system, such as shading correction, color correction and Y correction, and to the reader driving unit 118 for controlling reader input driving. The CCD line sensor 26 is connected to reader input image data processor 116. Reader input image data processor 116 is connected to the main image processor 106 through the multi-value image composition unit 121.

Next, details of the interface unit 127 and the memory unit 126 of a preferred embodiment will be described below.

The interface unit 127 has specifications such as those of GPIB or SCSI, and exchanges image signals, commands and the like with an external unit. The memory unit 126 stores image signals. The memory controller 128 effects address control of the memory, comprises a register counter or the like and issues access addresses to the memory. The external input image data processor 125 processes input images (for example, performs enlargement/reduction processing). In this embodiment, two kinds of reader images either a multi-value image supplied from the main image processor 106 or a binary image supplied from the binary encoder 122 can be selected. The output image processor 124 processes output images by Y correction, enlargement/reduction processing or the like. The output image processor 124 outputs two kinds of image, i.e., a multi-value image to the multi-value composition unit 121 and a binary image to the binary composition unit 123.

Image data output processing diagrams of FIGS. 5A, 5B and 6 to 8

Figure 6:
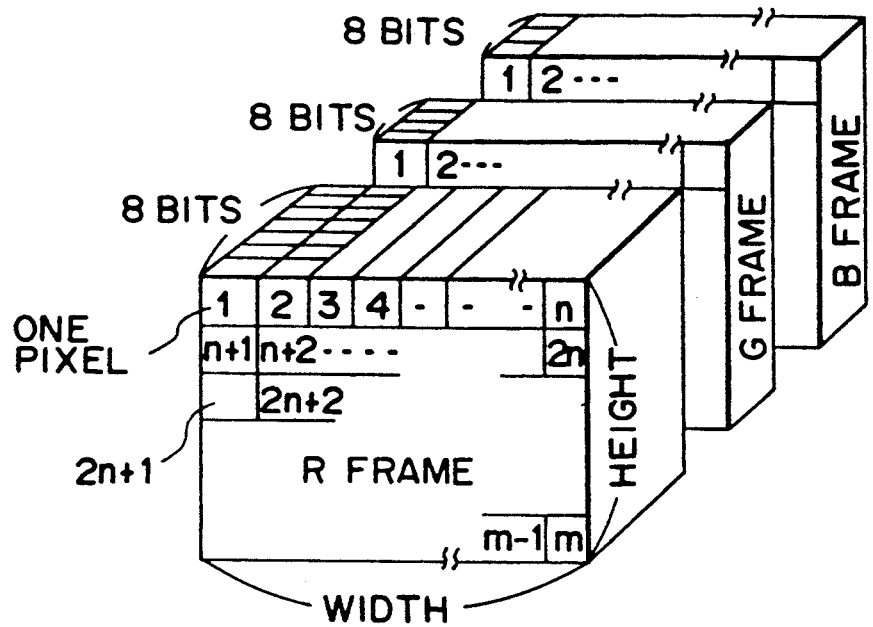
FIG. 6 is a schematic diagram illustrating image data transfer with respect to each of red, green and blue frames.
Figure 7:
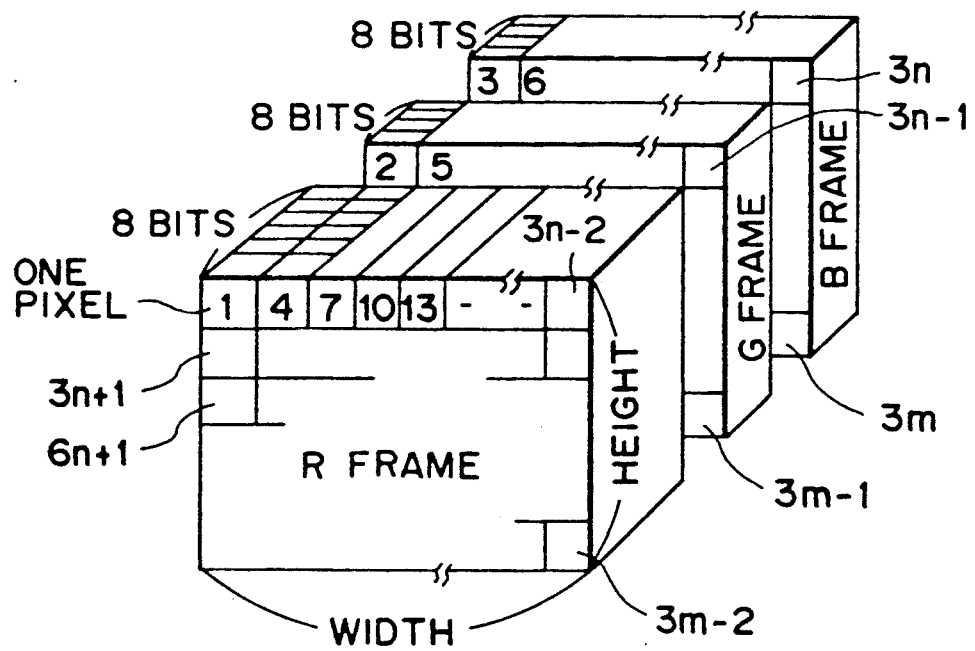
FIG. 7 is a schematic diagram illustrating transfer of red, green and blue image data components with respect to each pixel.
Figure 8:
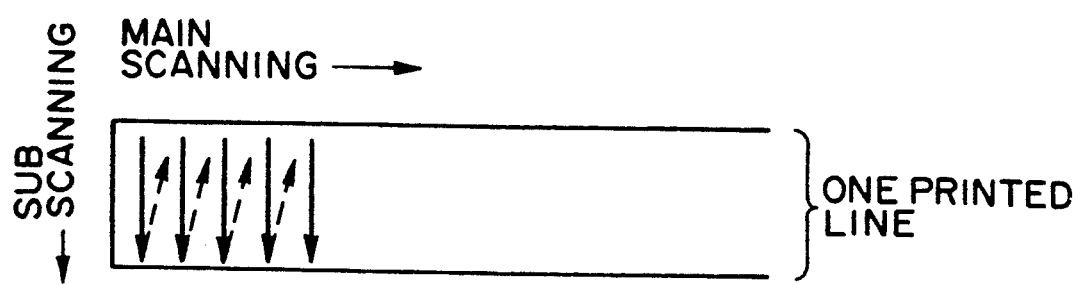
FIG. 8 is a diagram of a printing sequence of printing unit 20 shown in FIG. 3.

Details of an image data outputting processing procedure executed by the interface control slave CPU 120 in digital color copier 10 constructed as described above, particularly with respect to a case of receiving image data transmitted from an external unit and outputting a print, will be described below with reference to the flow charts of FIGS. 5A and 5B the diagrams of the image data structure shown in FIGS. 6 and 7, and the diagram of directions of printing processing shown in FIG. 8. Image data referred to in the following description is full-color image data such that each pixel is constituted by color components R, G, and B and each color component is represented by 8 bits. The digital color copier of this embodiment has two image data processing modes: a frame data sequential processing mode and a pixel data sequential processing mode.

Figure 5A:
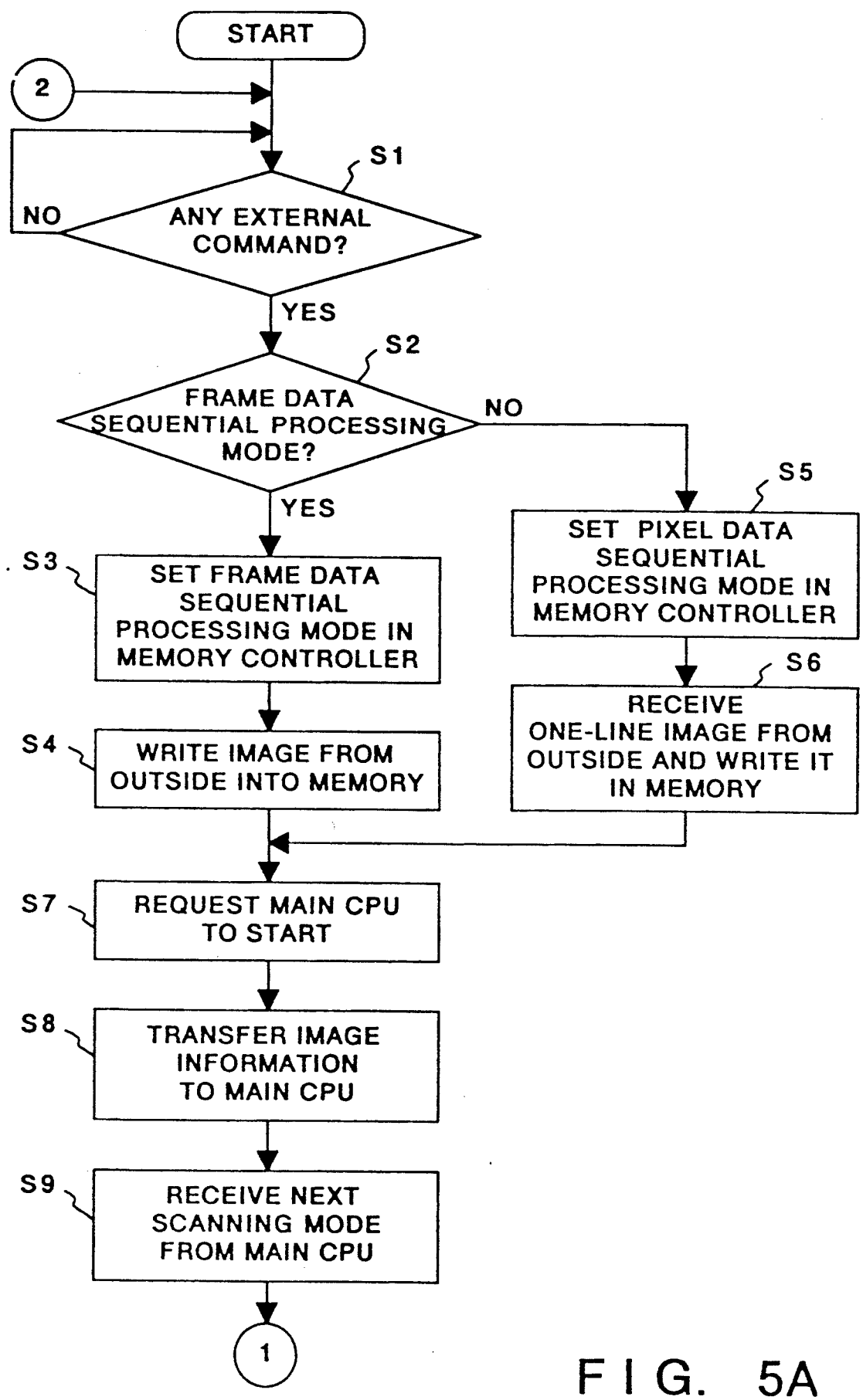
FIGS. 5A and 5B are flow charts of image data output processing executed by the system shown in FIGS. 4A and 4B.

Referring to FIG. 5A. step S1, a determination is made as to whether or not an external command is received awaited. If an external command is received, the process proceeds to step S2. In step S2, the external command is analyzed to determine whether the mode of image data to be received corresponds to a frame data sequential processing mode or pixel data sequential processing mode. In actual processing, types of command analysis other than this type of analysis for determining the image mode maybe made as to an instruction of image input or output, the number of image sheets, and the like. However, a case of outputting one image will be described below for ease of explanation. If it is determined in step S2 that the mode of the received image data corresponds to the pixel data sequential processing mode, the process proceeds to step S3, or, in the case of the pixel data sequential processing mode, the process proceeds to step S5.

In step S3, the processing mode of the memory controller 128 is set to the frame data sequential processing mode. If the processing mode is the frame data sequential processing mode, the image data is transferred from the external unit in order of R, G, and B and in order of numbers (1, 2, 3, . . . , n) attached to pixels with respect to the colors as shown in FIG. 6. Accordingly, if this mode is set, the memory controller 128 (FIG. 4A) recognizes transmission of the image data in this transfer order and performs a corresponding memory address control. In step S4, a data transfer permission response is transmitted to the external unit, and the image data is received via the interface unit 127 and is written in the memory unit 126. After the completion of this writing, the process proceeds to step S7.

On the other hand, in step S5, the processing mode of the memory controller 128 is set to the pixel data sequential processing mode. Pixel data sequential processing is an approach of processing color components R, G, and B of full-color image data with respect to each pixel. Accordingly, in the case of the pixel data sequential processing mode, the color component (R, G, B) data of the image data is sequentially transferred with respect to each pixel as indicated by numbers (1, 2, 3, . . . , n) attached to the pixels shown in FIG. 7. In the actual data transfer in accordance with this embodiment, however, image data for one line is transferred at a time, considering the transfer efficiency, the capacity of the memory unit 126, the structure of the recording head 56 of the printing unit 20, and so on. Memory unit 126 can store the amount of image data corresponding to one printed line shown in FIG. 8. Accordingly, if the pixel data sequential processing mode is set, the memory controller 128 recognizes transmission of the image data in this transfer order and performs a corresponding memory address control. In step S6, a data transfer permission response is transmitted to the external unit, and image data corresponding to one line is received via the interface unit 127 and is written in the memory unit 126. After the completion of writing, the process proceeds to step S7.

In step S7, the interface control slave CPU 120 requests the main CPU 100 to start outputting the image. In step S8, the interface control slave CPU 120 transmits information on the size and the output position of the output image and other information items to the main CPU 100. The main CPU 100 sets, based on this information, parameters necessary for print outputting in the multi-value composition unit 121, the main image processor 106, the binary composition unit 123, the printing unit 20 and other components. Further, in step S9, the main CPU 100 transmits information necessary for the next scanning (information on printing width in the main or sub scanning direction and other factors) to the interface control slave CPU 120.

Figure 5B:
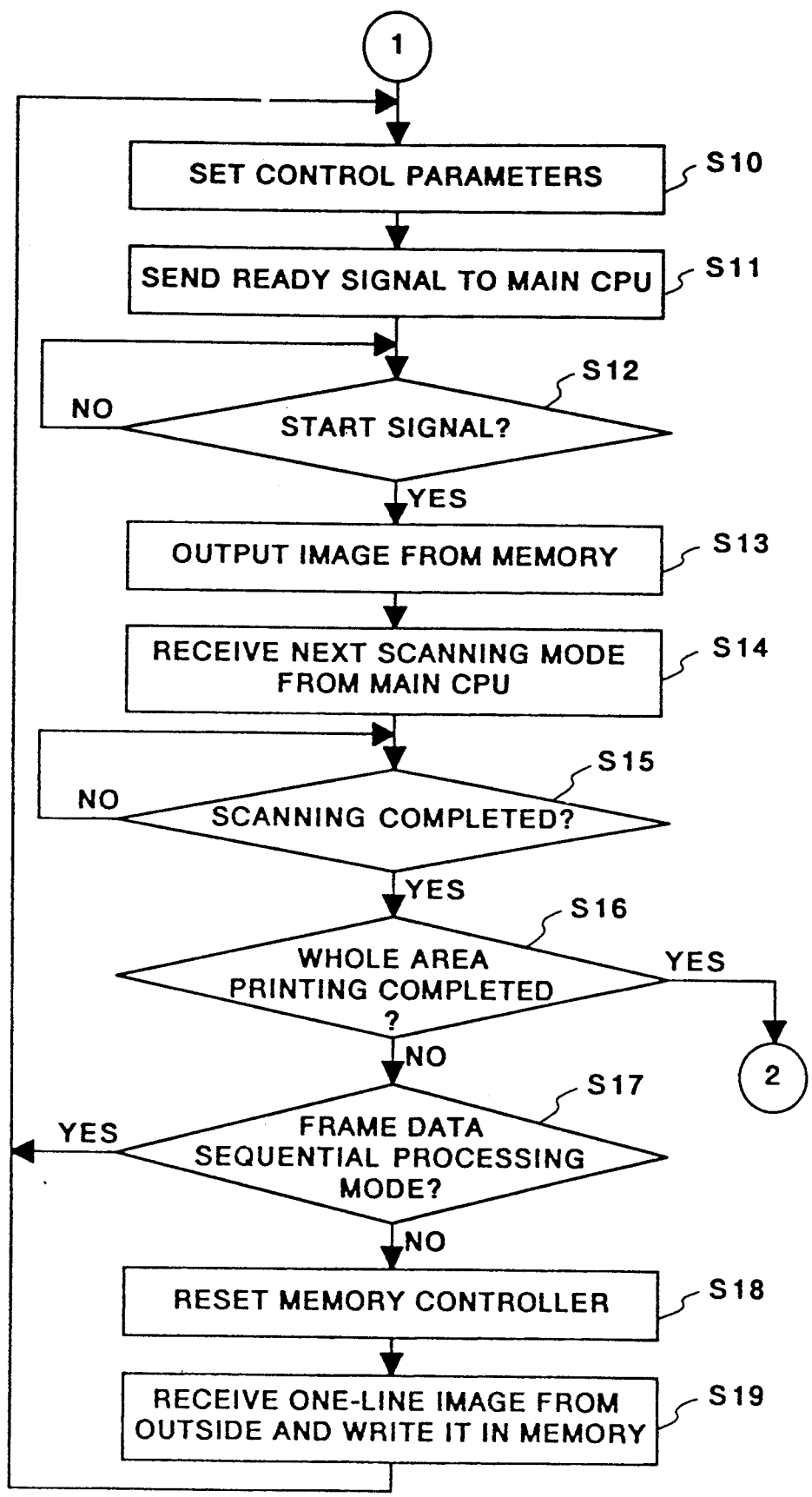

Referring to FIG. 5B, in step S10, control parameters necessary for the output image processor 124 and the memory controller 128 are set. The control parameters are set so that the image stored in the memory unit 126 is read out in accordance with a printing process having a cycle of steps of outputting the image in the sub scanning direction by an amount corresponding to the width of one printed line, moving the head to an extent corresponding to the size of one pixel each time one stroke of this outputting is completed, and performing printing in the sub scanning direction for one line width again, as shown in FIG. 8.

After the completion of this setting, the process proceeds to step S11, and the interface control slave CPU 120 sends a ready signal to the main CPU 100. In step S12, a start signal for permitting an image outputting start is awaited. If the interface control slave CPU 120 receives the start signal from the main CPU 100, the process proceeds to step S13. In step S13, outputting the image from the memory unit 126 is started. That is, the printing operation of the printing unit 20 is started. In step S14, the next scanning mode is received from the main CPU 100 as in step S9, and the process then proceeds to step S15 to wait for the completion of one-line printing. After one-line printing has been completed, the process proceeds to step S16.

In step S16, examination is made as to whether or not the whole image data has been output. If Yes, the process returns to step S1 to wait for an external command. If No, the process proceeds to step S17. In step S17 the image data processing mode is examined again. If the processing mode is the frame data sequential processing mode, the process returns to step S10 or, if not, the processing mode is the pixel data sequential processing mode, the process proceeds to step S18.

Since the pixel data sequential processing mode is a mode of printing an image each time image data for one line is received, there is a need to prepare for receiving the next one-line data from the external unit. Accordingly in step S18, the memory controller 128 is set to the pixel data sequential processing mode as was previously executed in step S5. The process then proceeds to step S19 to receive one-line image data from the external unit and write same in the memory unit 126, as in step S6. After the completion of this writing, the process returns to step S10.

In the above description, the relationship between the amount of received image data and the capacity of the memory unit 126 has not been mentioned. In this embodiment, however, the following processing is performed according to the image reception mode.

For example, assuming that the memory unit 126 has a capacity for storing at most an amount of data corresponding to a full-color image of JIS A6 size (having components R, G, and B each represented by 8 bits) and if an image having a data size greater than the A6 size is transmitted in the frame data sequential processing mode, the interface control slave CPU 120 outputs, based on the result of command analysis, a message to inform the external unit through the interface unit 127 of a reception unable state.

Figure 9:
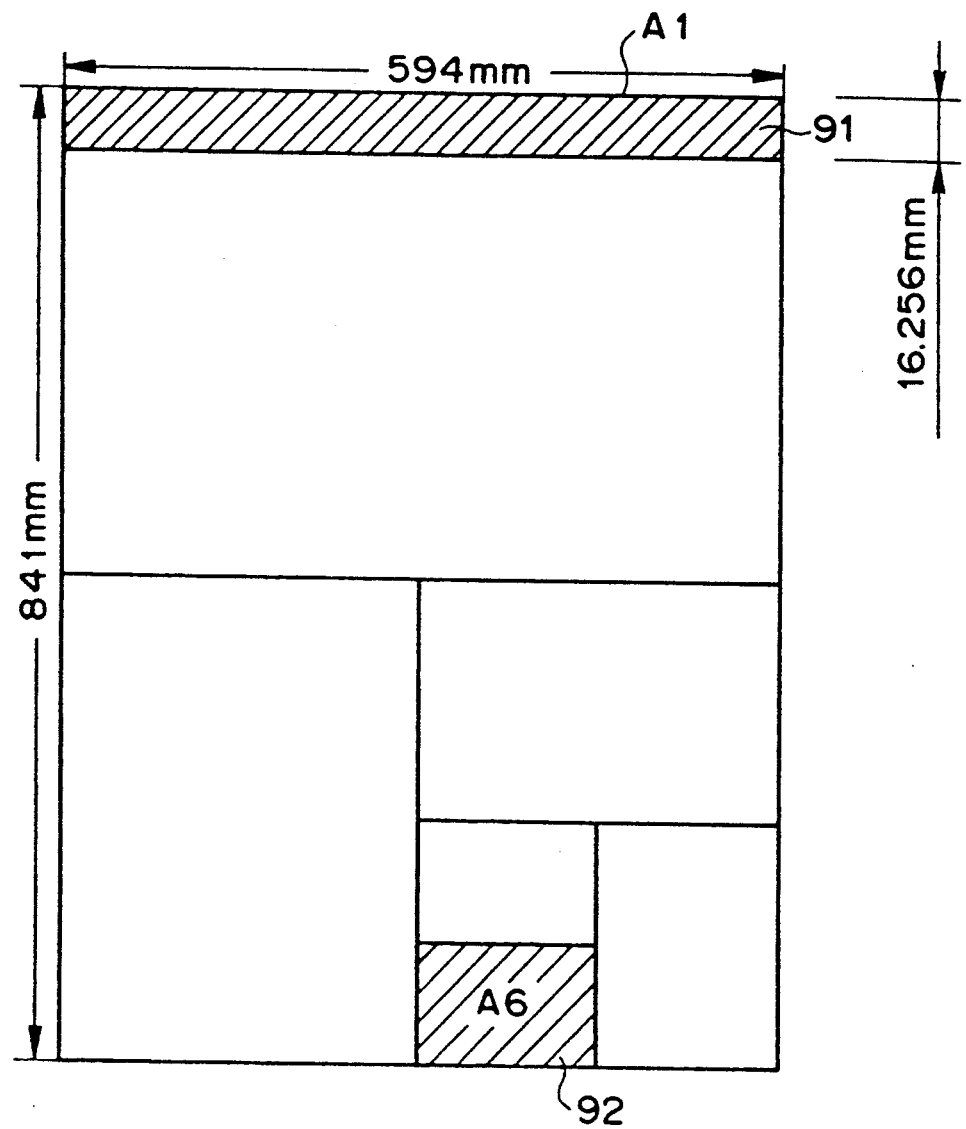
FIG. 9 is a diagram illustrating transfer of an amount of image data which is greater than the capacity of memory unit 126.

In a case where image data is received in the pixel data sequential processing mode, the image data in accordance with A1 size is divided as shown in FIG. 9 and a part of the image data corresponding to a hatched region 91 is written in the memory unit 126, since the image data is received with respect to a unit size corresponding to one line, even if the amount of received data is greater than A6 size (corresponds to A1 size, for example). After being written, the data is read out and output as a print. This process of writing an amount of image data corresponding to hatched area 91 in the memory unit 12 and reading out and outputting the image data as a print is repeated until the A1 size image data is entirely processed, thus forming an image in accordance with the A1 size image data.

As shown in FIG. 9, the amount of data corresponding to A6 size is $1/32\ (=(\frac{1}{2})^5)$ of the amount of data corresponding to A1 size.

Thus, in this embodiment, the apparatus can process an image in accordance with each of a plurality of image modes, such as frame/pixel data sequential processing modes by effectively making use of a limited capacity memory.

OTHER EMBODIMENTS

The first embodiment of the present invention has been described on the assumption that the data size, enlargement and other parameters are set as desired at the time of image input/output by an external command. In another embodiment of the present invention, an execution of image processing in a case where some of these parameters are fixed and other parameters are automatically modified by the apparatus based on the fixed parameters will be described. The apparatus used in this embodiment is the same as the above-described apparatus, and the components thereof are indicated by the same reference numerals and the description for them will not be repeated.

In this embodiment, the capacity of the memory unit 126 is smaller than the amount of image data corresponding to A1 size but is greater than the amount of one-line data in image data corresponding to A1 size.

First, a case of fixing a parameter for image data processing modes will be described below.

Figure 10A:
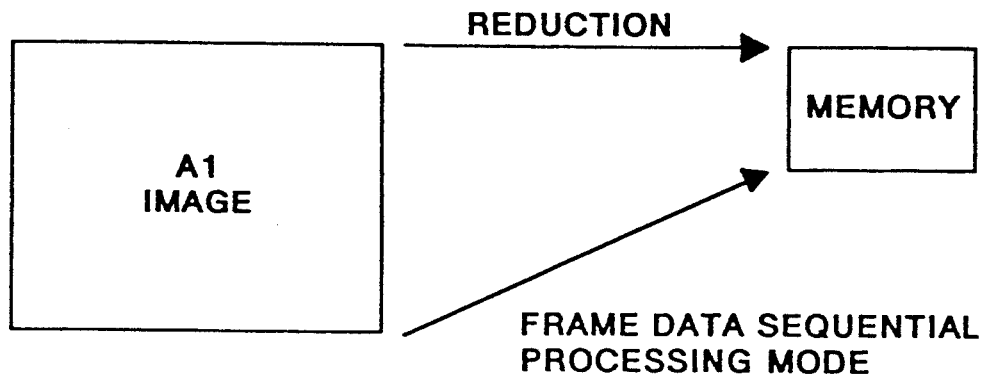
FIGS. 10A and 10B are diagrams illustrating execution of processing for inputting A1 size image data in the memory in accordance with set image modes.
Figure 10B:
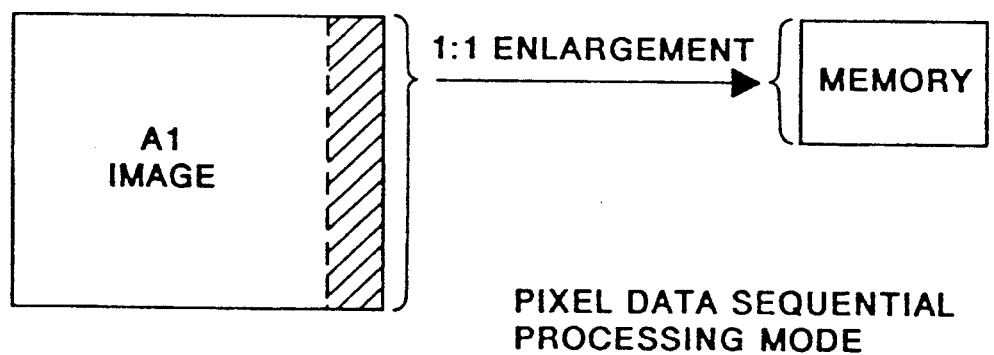

FIGS. 10A and 10B are diagrams showing processing of writing image data corresponding to A1 size in the memory unit 126; FIG. 10A relates to a case of processing in the frame data sequential processing mode while FIG. 10B relates to a case of processing in the pixel data sequential processing mode.

Since the capacity of the memory unit 126 is not large enough to entirely store A1 size image data, a reduction rate is automatically calculated in the apparatus based on the ratio of the amount of image data and the available capacity of the memory unit 126 at the time of the frame data sequential processing mode and is set in the external input image data processor 125. The image data is sampled in accordance with this reduction rate and is stored in the memory unit 126. At the time of the pixel data sequential processing mode, it is sufficient to read an amount of image data corresponding to one line in theory, and A1 size image is therefore read at a 1:1 enlargement.

A case of fixing a parameter for the image data enlargement processing will be described below (assuming that the input image is processed at a 1:1 enlargement).

Figure 11A:
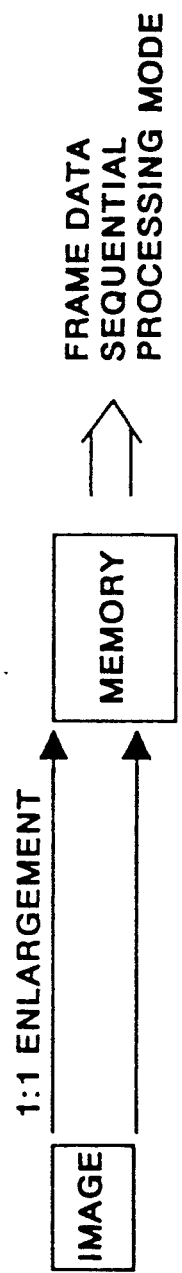
FIGS. 11A and 11B are diagrams illustrating execution of processing for inputting a predetermined amount of image data in the memory at a set magnification.
Figure 11B:
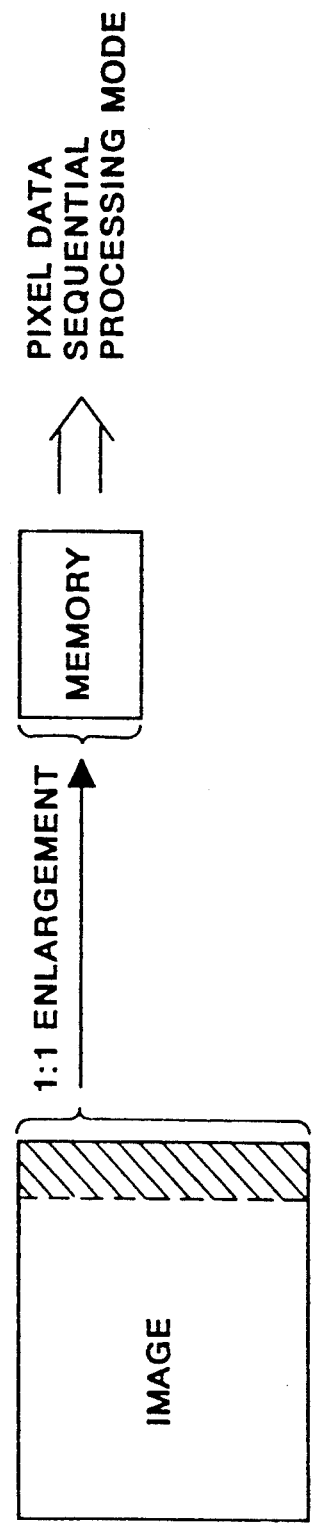

FIGS. 11A and 11B are diagrams showing processing of writing image data corresponding to a predetermined size at a 1:1 enlargement (that is, writing without enlarging or reducing the image) in the memory unit 126; FIG. 11A relates to a case of selecting the frame data sequential processing mode while FIG. 11B relates to a case of selecting the pixel data sequential processing mode.

If the size of data on a read image is smaller than the capacity of the memory unit 126 as shown in FIG. 11A, processing in the frame data sequential processing mode is possible and the apparatus therefore selects the frame data sequential processing mode automatically. If the size of image data is greater than the capacity of the memory unit 126, the apparatus automatically selects the pixel data sequential processing mode.

Thus, in this embodiment, image data is input by automatically setting the enlargement (enlargement or reduction rate) of image data according to the image mode set from the outside and the size of the area of the memory unit 126 for execution of data input/output operation, or image data is input by automatically selecting the image data processing mode according to the enlargement factor set from the outside and the area of the memory unit 126 for execution of data input/output operation.

Information on automatic setting in the apparatus can also be transmitted to the external unit. For example, the image mode automatically set by the apparatus as in the case shown in FIG. 11A or 11B is transmitted to the external unit, so that the external unit equivalent to the apparatus can be prepared for data transmission/reception in accordance with the set image mode.

The embodiments have been described with respect to a case of receiving image data from an external unit and outputting a print image, but the present invention is not limited to this process. For example, the present invention can also be applied to a process of reading an image by reader unit 12 and outputting the read data to an external unit. That is, the procedure of image transfer from an external unit to the memory unit and print output is simply replaced by the procedure of image transfer from the reader unit to the memory unit and image transfer from the memory unit to an external unit. In this case, image data having components R, G, and B is written in the memory unit and thereafter transferred to the external unit at the time of the frame data sequential processing mode, while a procedure of reading one-line image data and transferring the same to the external unit is repeated at the time of the pixel data sequential processing mode. These two modes can be selected in accordance with the use.

The hardware construction is not limited to that of the above-described embodiments. For example, if the apparatus is arranged by considering the manufacture cost rather than the processing speed, a construction may be adopted such that the interface control slave CPU is removed and the main CPU takes over the control function corresponding to that of the slave CPU. The number of interface output/input lines is not necessarily limited to one as in the case of the described embodiments; a plurality of interface output/input lines may be provided.

With respect to the above-described embodiments, only two multiple-value RGB modes: the frame data sequential processing mode and the pixel data sequential processing modes have been described as image modes, but this is not exclusive. For example, the image may be expressed by binary data or multiple-value data with color components C, M, Y, and BK, or two or more image modes may be used.

With respect to the above-described embodiments, the digital color copier constituted by the reader unit and the printing unit has been described as an example of an application of the image processor of the present invention. However, the present invention is not limited to this and can be applied to, for example, a reader apparatus and a printer apparatus provided independently of each other but arranged generally in the same manner as described above.

As many different embodiments of the present invention can be made without departing from the spirit and scope thereof, it is to be understood that the invention is not limited to the specific embodiments thereof except as defined in the appended claims.

What is claimed is:

1. An image processing apparatus which receives an image signal transmitted in one of a plurality of different modes to process an image of one picture, comprising:
    analysis means for analyzing the contents of the modes;
    first processing means for sequentially processing the image signal for one picture while receiving the same, part by part, in accordance with the result of analysis effected by said analysis means;
    second processing means for receiving the whole image signal for one picture and for processing the same, as a block, in accordance with the result of analysis effected by said analysis means; and
    output means for outputting the image processed by one of either said first or second processing means.

2. The apparatus according to claim 1, wherein said first processing means includes:
    input means for inputting at least a unit image signal corresponding to the image processed by said output means at a time in the image signal for one picture;
    memory means for storing at least the unit image signal input by said input means;
    transfer means for reading out the image signal and transferring to said output means each time the image signal is stored in said memory means; and
    control means for effecting a control such that the next unit image signal is received to be stored in said memory means each time the output from said output means is completed.

3. The apparatus according to claim 2, wherein said input means includes:
    interface means for receiving an image signal from an external unit; and
    read means for reading an image original.

4. The apparatus according to claim 3, wherein said read means includes generation means for irradiating the image original with light to generate an image signal from reflection of the irradiation light.

5. The apparatus according to claim 4, wherein said generation means includes a coupled charged device.

6. The apparatus according to claim 2, wherein said image signal is a color image signal, and said input means sequentially receives information on color components constituting the color image signal with respect to each pixel.

7. The apparatus according to claim 6, wherein said color image signal has color components for red, green and blue or for yellow, magenta, cyan and black.

8. The apparatus according to claim 1, wherein said second processing means includes:
    input means for inputting the image signal for one picture at a time;
    memory means for storing at least the image signal for one picture; and
    transfer means for sequentially reading the image signal and transferring the image signal to said output means, when storing the image signal in said memory means is completed.

9. The apparatus according to claim 8, wherein said input means includes:
    interface means for receiving an image signal from an external unit and for transferring the image signal to said memory means; and
    read means for reading an image original.

10. The apparatus according to claim 9, wherein said read means includes generation means for irradiating the image original with light to generate an image signal from reflection of the irradiation light.

11. The apparatus according to claim 10, wherein said generation means includes a coupled charged device.

12. The apparatus according to claim 9, wherein said interface means includes:
    comparison means for comparing the amount of the received image signal with the storage capacity of said memory means at the time of reception of the image signal from the external unit; and
    notification means for notifying to the external unit that reception can be performed or that reception cannot be performed in accordance with the result of comparison effected by said comparison means.

13. The apparatus according to claim 8, wherein said image signal is a color image signal, and said input means sequentially receives information on color components constituting the color image signal.

14. The apparatus according to claim 13, wherein said color image signal has color components for red, green and blue or for yellow, magenta, cyan and black.

15. The apparatus according to claim 1, wherein said output means comprises a printer for forming an image on a recording medium by depositing ink by film boiling.

16. The apparatus according to claim 15, wherein said printer has a recording head which is positioned so as to face the recording medium and which forms an image by scanning over the recording medium, and said recording head forms, by one cycle of scanning, an image having a plurality of pixels arranged in a direction perpendicular to the direction of the scanning in a rectangular region elongated in the direction of the scanning.

17. The apparatus according to claim 1, further comprising:
memory means for storing the image signal;
checking means for examining the mode, the amount of the received signal and the capacity of the memory means at the time of reception of the image signal; and
changeover means for changing processing, based on the result of checking of said checking means in such a manner as to select said first processing means to process the image signal if the amount of the received image signal is greater than the capacity of said memory means, even when said second processing means is to be selected to process the image signal in accordance with the result of analysis.

18. An image processing apparatus which receives an image signal transmitted in one of a plurality of different modes to process an image of one picture, comprising:
memory means for storing the image signal;
checking means for examining the mode, the size of the received image signal and the capacity of the memory means at the time of reception of the image signal; and
control means for effecting a control, based on the result of checking of said checking means, in a manner such that the size of the image signal is less than or equal to the capacity of said memory means, if the total size of the received image signal is greater than the capacity of said memory means, while disabling the control, if the total size of the received image signal is not greater than the capacity of said memory means.

19. The apparatus according to claim 18, wherein said control means includes sampling means for sampling the received image signal and for storing the sampled signal in said memory means.

20. An image processing method in which an image signal received in a designated one of a plurality of different modes is stored on a recording medium, and in which the image signal is read from the recording medium to process an image of one picture, comprising the steps of:
sampling the received image signal with a sampling size which is less than or equal to the capacity of the recording medium, if the total size of the received image signal is greater than the capacity of the recording medium; and
suppressing the sampling, if the total size of the received image signal is not greater than the capacity of the recording medium.

21. An image processing method in which an image signal received in a designated one of a plurality of different modes is stored on a recording medium, and in which the image signal is read from the recording medium to process an image of one picture, comprising the steps of:
sequentially processing the image signal for one picture while receiving the same, part by part, irrespective of the mode, if the total size of the received image signal is greater than the capacity of the recording medium; and
processing the whole received image signal for one picture at a time, if the total size of the received image signal is not greater than the capacity of the recording medium.

22. An image processing method in which an image signal transmitted in one of plurality of different modes is received to process an image of one picture, comprising:
an analysis step of analyzing the contents of the modes;
a first processing step of sequentially processing the image signal for one picture while receiving the same, part by part, in accordance with the result of analysis effected in said analysis step;
a second processing step of receiving the whole image signal for one picture and for processing the same, as a block, in accordance with the result of analysis effected is said analysis step; and
an output step of outputting the image processed in one of either said first or second processing steps.

23. The method according to claim 22, further comprising:
a storage step of storing the received image signal in a memory medium;
a checking step of examining the mode analyzed in said analysis step, the size of the received signal and the capacity of the memory medium at the time of reception of the image signal; and
a changeover step of changing the processing, based on the result of checking in said checking step, in such a manner as to select said first processing step to process the image signal if the size of the received image signal is greater than the capacity of the memory medium, even when said second processing step is to be selected to process the image signal in accordance with the result of analysis effected in said analysis step.

24. The method according to claim 22, wherein said output step uses a printer.

25. The method according to claim 24, wherein the printer forms an image on a recording medium by depositing ink by film boiling.

26. The method according to claim 25, wherein the printer has a recording head which is positioned so as to face the recording medium and which forms an image by scanning over the recording medium, and the recording head forms, by one cycle of scanning, an image having a plurality of pixels arranged in a direction perpendicular to the direction of the scanning in a rectangular region elongated in the direction of the scanning.

27. The method according to claim 22, wherein said first processing step includes:
an input step of inputting at least a unit image signal corresponding to the image processed in said output step at a time in the image signal for one picture;
a storage step of storing at least the unit image signal input in said input step;
a transfer step of reading out the image signal and transferring to said output step each time the image signal is stored in said storage step; and a control step of effecting a control such that the next unit image signal is received to be stored in said storage step each time the output from said output step is completed.

28. The method according to claim 27, wherein said input step includes:
   a reception step of receiving an image signal from an external unit; and
   a read step of reading an image original.

29. The method according to claim 28, wherein said read step includes a generation step of irradiating the image original with light to generate an image signal from reflection of the light.

30. The method according to claim 29, wherein said generation step uses a charge coupled device.

31. The method according to claim 27, wherein the image signal is a color image signal, and in said input step, information on color components constituting the color image signal with respect to each pixel is sequentially received.

32. The method according to claim 31, wherein the color image signal has color components for red, green and blue or for yellow, magenta, cyan and black.

33. The method according to claim 22, wherein said second processing step includes:
   an input step of inputting the image signal for one picture at a time;
   a memory step of storing at least the image signal for one picture in a memory medium; and
   a transfer step of sequentially reading the image signal and transferring the image signal to said output step, when storing the image signal in said memory step is completed.

34. The method according to claim 33, wherein said input step includes:
   an interface step of receiving an image signal from an external unit and of transferring the image signal to the memory medium; and
   a read step of reading an image original.

35. The method according to claim 34, wherein said read step includes a generation step of irradiating the image original with light to generate an image signal from reflection of the light.

36. The method according to claim 35, wherein said generation step uses a charge coupled device.

37. The method according to claim 34, wherein said interface step includes:
   a comparison step of comparing the size of the received image signal with the storage capacity in the memory medium at the time of reception of the image signal from the external unit; and
   a notification step of notifying the external unit that reception can be performed or that reception cannot be performed in accordance with the result of a comparison effected in said comparison step.

38. The method according to claim 33, wherein the image signal is a color image signal, and in said input step, information on color components constituting the color image signal is sequentially received.

39. The method according to claim 38, wherein the color image signal has color components for red, green and blue or for yellow, magenta, cyan and black.

* * * * *

UNITED STATES PATENT AND TRADEMARK OFFICE
CERTIFICATE OF CORRECTION

PATENT NO. : 5,315,404

DATED : May 24, 1994

INVENTOR(S) : KEIJU KUBOKI ET AL.

It is certified that error appears in the above-identified patent and that said Letters Patent is hereby corrected as shown below:

Title Page:

AT [56] REFERENCES CITED

U.S. Patent Documents, insert
--4,723,129  2/1988  Endo et al.--.

Foreign Patent Documents, insert
--54-59936  5/1979  Japan--.

COLUMN 1

Line 30, "an" should read --a--.

COLUMN 2

Line 35, "manned" should read --manner--.
Line 39, "means" should read --means,--.

COLUMN 8

Line 15, "Connected" should read --Connected to--.
Line 33, "an" should read --a--.

COLUMN 9

Line 4, "images" should read --images,--.
Line 8, "Y correction" should read --γ correction--.
Line 10, "image," should read --images,--.
Line 22, "5B" should read --5B,--.
Line 32, "FIG. 5A." should read --FIG. 5A, in--.
Line 34, "received awaited." should read --received.--.
Line 41, "maybe" should read --may be--.

UNITED STATES PATENT AND TRADEMARK OFFICE
CERTIFICATE OF CORRECTION

PATENT NO. : 5,315,404
DATED : May 24, 1994
INVENTOR(S) : KEIJU KUBOKI ET AL.

It is certified that error appears in the above-identified patent and that said Letters Patent is hereby corrected as shown below:

<u>COLUMN 11</u>

Line 8, "ingly" should read --ingly,--.
    Line 12, "same" should read --the same--.

<u>COLUMN 14</u>

Line 50, "coupled charged" should read --charge coupled--.

<u>COLUMN 16</u>

Line 13, "of-plurality" should read --of a plurality--.
    Line 25, "is" should read --in--.

Signed and Sealed this

Thirteenth Day of December, 1994

Attest:

BRUCE LEHMAN

*Attesting Officer*  *Commissioner of Patents and Trademarks*